United States Patent [19]

Hodge

[11] 4,285,064

[45] Aug. 18, 1981

[54] TDMA SATELLITE COMMUNICATION SYSTEM

[75] Inventor: Gene D. Hodge, Germantown, Md.

[73] Assignee: IBM Corporation, Armonk, N.Y.

[21] Appl. No.: 79,927

[22] Filed: Sep. 28, 1979

[51] Int. Cl.³ ............................................. H04B 7/185
[52] U.S. Cl. ...................................... 455/13; 370/114
[58] Field of Search ...................... 375/3, 107; 455/12, 455/13; 370/93, 95, 97, 100, 103, 104, 112; 364/102, 107, 117, 514; 371/7, 11

[56] References Cited

U.S. PATENT DOCUMENTS

| 3,878,339 | 4/1975 | Maillet | 370/104 |
| 4,105,973 | 8/1978 | Arnold et al. | 370/104 |

*Primary Examiner*—Benedict V. Safourek
*Attorney, Agent, or Firm*—John E. Hoel

[57] ABSTRACT

A time division multiple access satellite communication architecture is disclosed to achieve a relatively simple control procedure for permitting multiple computers to establish peer coupled transmission paths for high speed transfer by dynamically allocating satellite communication facilities in a sequentially shared broadcast mode. Each sequentially established CPU-to-CPU logical link takes the form of a point-to-multipoint sub-network which incorporates a standard data link control protocol for the control of information transfer. The function of the primary station is sequentially passed from station to station within the network and as each station assumes primary control of its logical point-to-multipoint circuit, other stations conform to the secondary role for that logical link configuration.

6 Claims, 13 Drawing Figures

AB: ACK BUFFERS

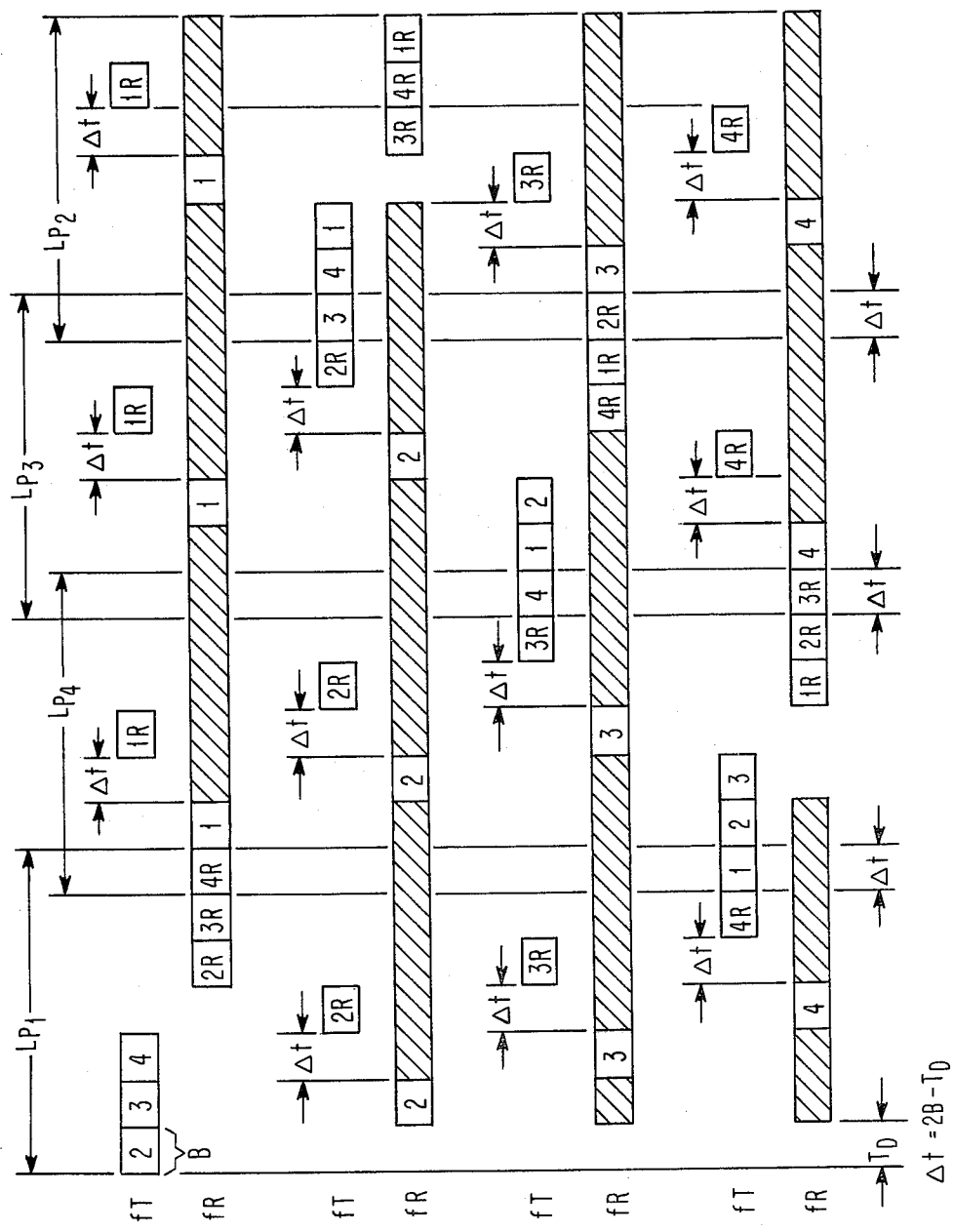

TDMA SATELLITE COMMUNICATION SYSTEM

FIELD OF THE INVENTION

The invention disclosed broadly relates to communications systems and more particularly relates to time division multiple access satellite communications.

BACKGROUND OF THE INVENTION

Time division multiple access (TDMA) telecommunication systems have a multiplicity of ground stations which communicate with one another by transmitting and receiving message signals via satellite. Prior art TDMA satellite communication systems generally operate principally in a duplex communication mode between respective pairs of ground stations. In order to correlate the operations of the many ground stations in this type of system, the transmission bursts from the several stations are synchronized to ensure that no overlap of signal bursts occurs even though the ground stations are located at such large distances from one another that significant propagation delay times exist between the various ground stations and the satellite transponder. The synchronization has been provided in the prior art by a fixed, principal reference station which transmits a reference burst to all other stations for synchronization of their respective local clocks. The prior art has addressed the problem of reference station failure by providing fixed, alternate reference stations which assume the reference station function when the loss of the original reference signal is detected. The limitation to principally duplex communication employed by these prior art fixed reference station systems has imposed limits on the data rates achievable for large volume, high speed digital communications in the network.

OBJECTS OF THE INVENTION

It is an object of the invention to provide an improved high capacity TDMA satellite communications network.

It is still another object of the invention to provide an improved TDMA satellite communications network which has a reduced sensitivity to reference station failure.

It is yet another object of the invention to provide a TDMA satellite communications network which has an improved data conferencing and broadcast circuit arrangement.

It is yet another object of the invention to provide an improved TDMA satellite communication network wherein multiple ground stations can share broadcast and conference circuits without interference with the TDMA system functioning.

SUMMARY OF THE INVENTION

These and other objects, features, and advantages of the invention are accomplished by the TDMA satellite communication architecture disclosed herein. A time division multiple access satellite communication architecture is disclosed which achieves a relatively simple control procedure for permitting multiple computers to establish peer coupled transmission paths for high speed transfer by dynamically allocating satellite communication facilities in a sequentially shared broadcast mode. Each sequentially established CPU-to-CPU logical link takes the form of a point-to-multipoint sub-network which incorporates a standard data link control protocol for the control of information transfers. The function of the primary station is sequentially passed from station to station within the network and as each station assumes primary control of its logical point-to-multipoint circuit, other stations conform to the secondary role for that logical link configuration. Specialized data conferencing and broadcast circuit arrangements can be implemented with the disclosed TDMA network. Access ports for these types of circuits can provide for high data retransmission between each ground station in the broadcast circuit. Simultaneous transmission by more than one ground station sharing the conference or broadcast circuit could saturate conventional TDMA controller elements. However, the disclosed invention establishes a protocol whereby multiple ground stations can share broadcast and conference circuits provided by TDMA systems without interference with the functioning of the TDMA system.

DESCRIPTION OF THE FIGURES

These and other objects, features, and advantages of the invention can be more fully appreciated with reference to the accompanying figures.

FIG. 2a illustrates a timing diagram for a super frame format where $T_D/B_1 = 1$.

DISCUSSION OF THE PREFERRED EMBODIMENT

Figure 1:
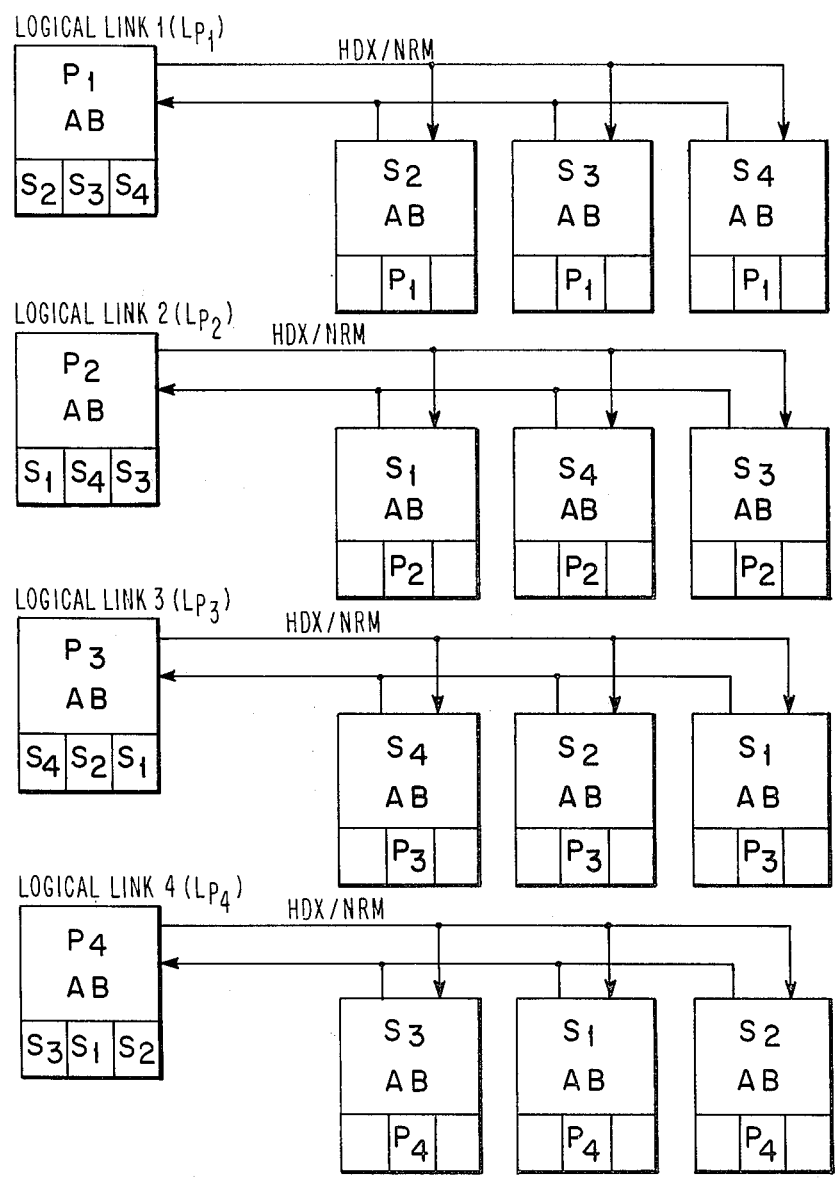
FIG. 1 is a block diagram of the logical link configurations for the invention.

A time division multiple access satellite communication architecture is disclosed to achieve a relatively simple control procedure for permitting multiple computers to establish peer coupled transmission paths for high speed data transfer by dynamically allocating satellite communication facilities in a sequentially shared broadcast mode. Each sequentially established CPU-to-CPU logical link takes the form of a point-to-multipoint subnetwork which incorporates a standard data link control protocol for the control of information transfer. The function of the primary station is sequentially passed from station to station within the network and as each station assumes primary control of its logical point-to-multipoint circuit, other stations conform to the secondary role for that logical link configuration.

System Description

The system architecture and rules of protocol defined for this invention provide a relatively simple control means for permitting multiple computers to establish peer coupled transmission paths for high speed data transfer by dynamically allocating satellite communications facilities to establish the required interconnections.

The invention defines a computer network control system which establishes multiple transmission paths between peer coupled computers through a broadcast satellite communications channel. Logical transmission circuits are sequentially established and then disconnected in order to provide total network connectivity for any computer (or terminal) to any computer (or terminal) connected to the network. Multiple logical links are established within a system controlled time division format. Each logical link takes the form of a point-to-multipoint sub-network which incorporates a standard data link control (DLC) protocol for control of information transfer. The recommended protocol for high speed data communications to be used with this invention is the standard form of HDLC defined by ISO documents IS 3309 and DIS 4335 and subsequent standard enhancements. This form of control protocol utilizes the unbalanced classes of procedures for two-way alternate (TWA) point-to-multipoint data transmissions in which, in addition to user information fields, a primary station transmits commands for link control and secondary stations respond to these commands. Sequential point-to-point logical circuits using a balanced class of link control procedures between stations can also be implemented as an alternate form of this invention.

In order to establish each logical link (using unbalanced classes of procedures for the purpose of this description) the function of the primary station is sequentially passed ("ring-around-the-primary" (RAP) procedure) from station-to-station within the network. As each station assumes primary control of its logical point-to-multipoint circuit, the other stations conform to the secondary role (with standard command/response relationships) for that logical link configuration.

Ring-Around-the-Primary (RAP) System Control Format

The RAP control format is completed when each station has had an opportunity to act as primary station of a logical link and has received responses from each of its assigned secondary stations (within prescribed time-out intervals). This format is repeated continuously as long as stations have data to transfer.

A station may disengage from the network by informing the primary station of the logical link which immediately preceeds in the link establishment sequence, the logical link in which the disengaging station was to have acted as primary station. The standard Disconnect Response (DISC) (see ISO document IS 3309 and DIS 4335) can be used for this function. Thus, control for primary station functions can be passed to another station in the network by simply skipping the logical link in which the disengaging station was to have been primary (this station is also deleted from the table of secondary stations for the other logical links by a monitoring function located within each of the stations that detects the modification to the logical link number sequencing).

Stations may be added to the network in a fixed logical link sequence if a request initialization mode response (RIM) is received from the engaging station by the primary station of the logical link immediately preceeding in sequence the logical link in which the engaging station is to act as primary. Thus, in a subsequent sequencing of logical links the engaging station will receive a command to become a primary from the preceeding primary station in the fixed sequencing control of logical link configurations.

Again, station monitoring facilities provide for including this new station as a secondary station in the other logical link configurations.

An example of the subject control system and the associated logical link configurations is described in the following paragraphs. A four station network is used for the description.

Figure 2:
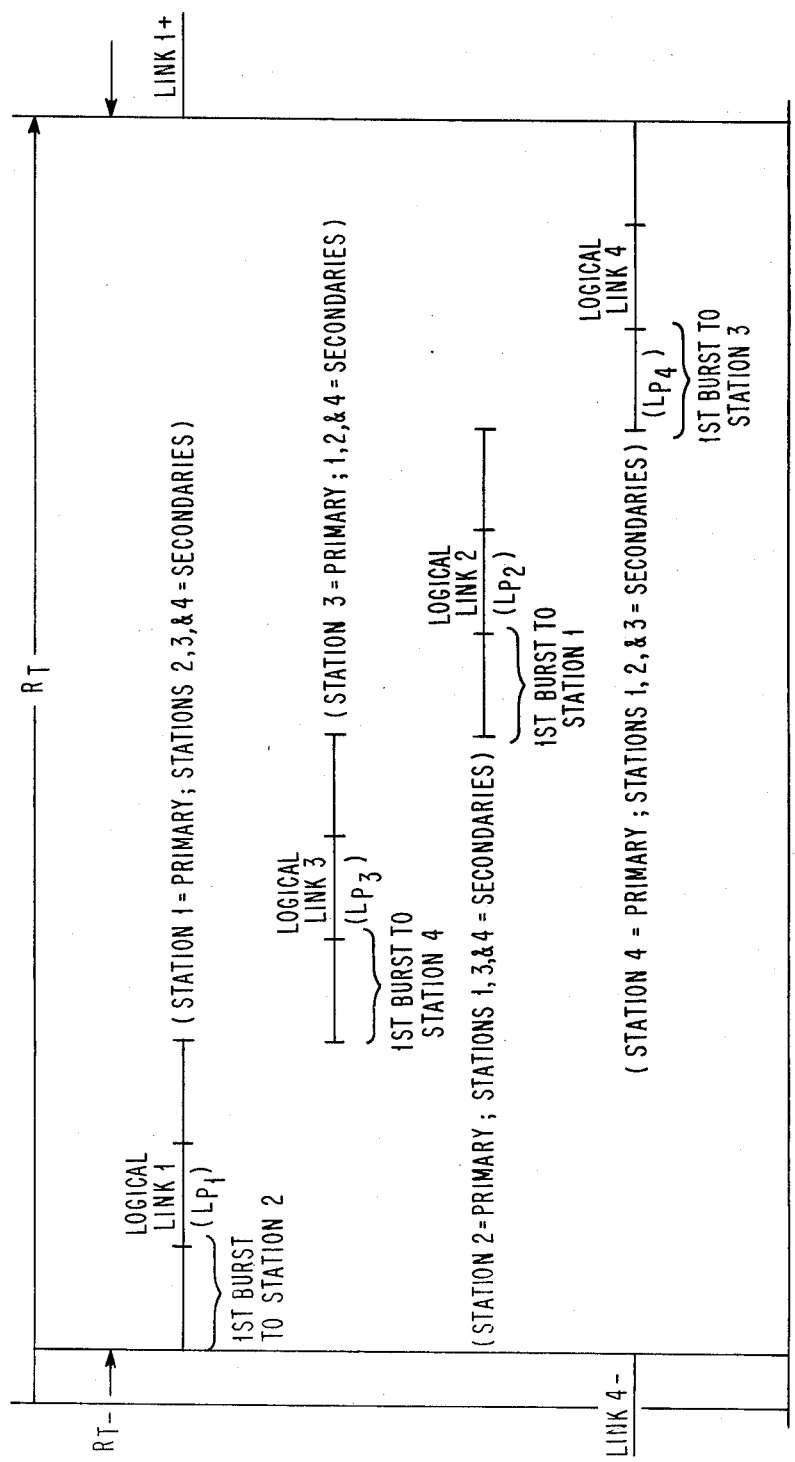
FIG. 2 is a timing diagram of the invention, the sequencing of logical links within a super frame format.
Figure 2B:
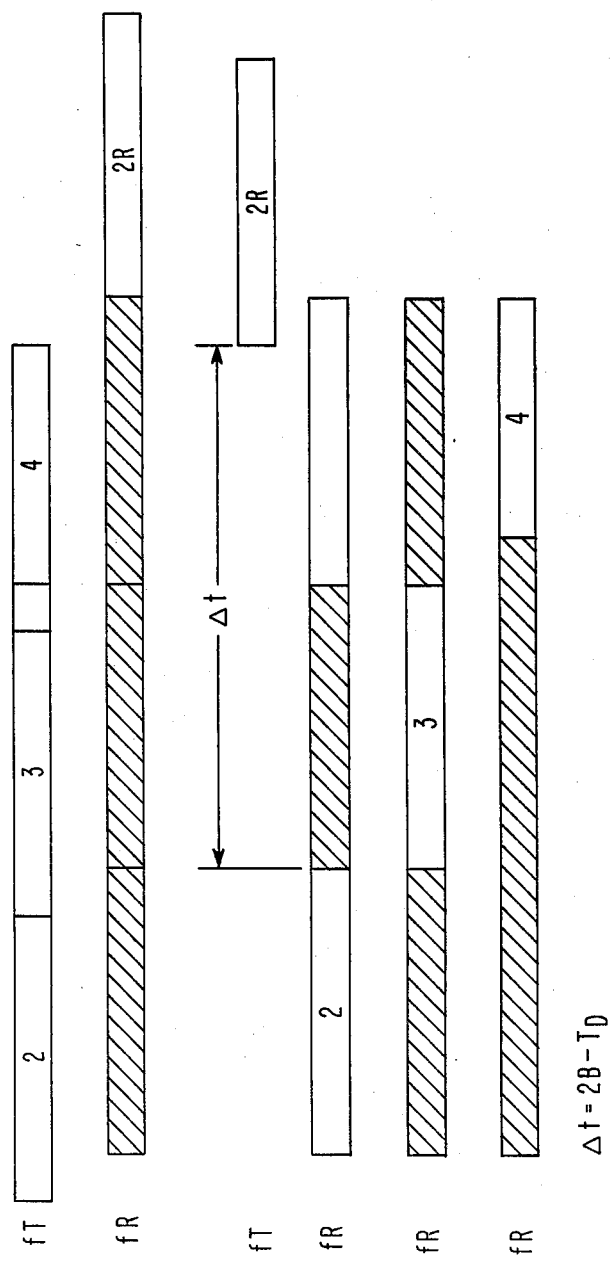
FIG. 2b is a timing diagram for a super frame format illustrating $\Delta t = 2B - T_D$.
Figure 3A:
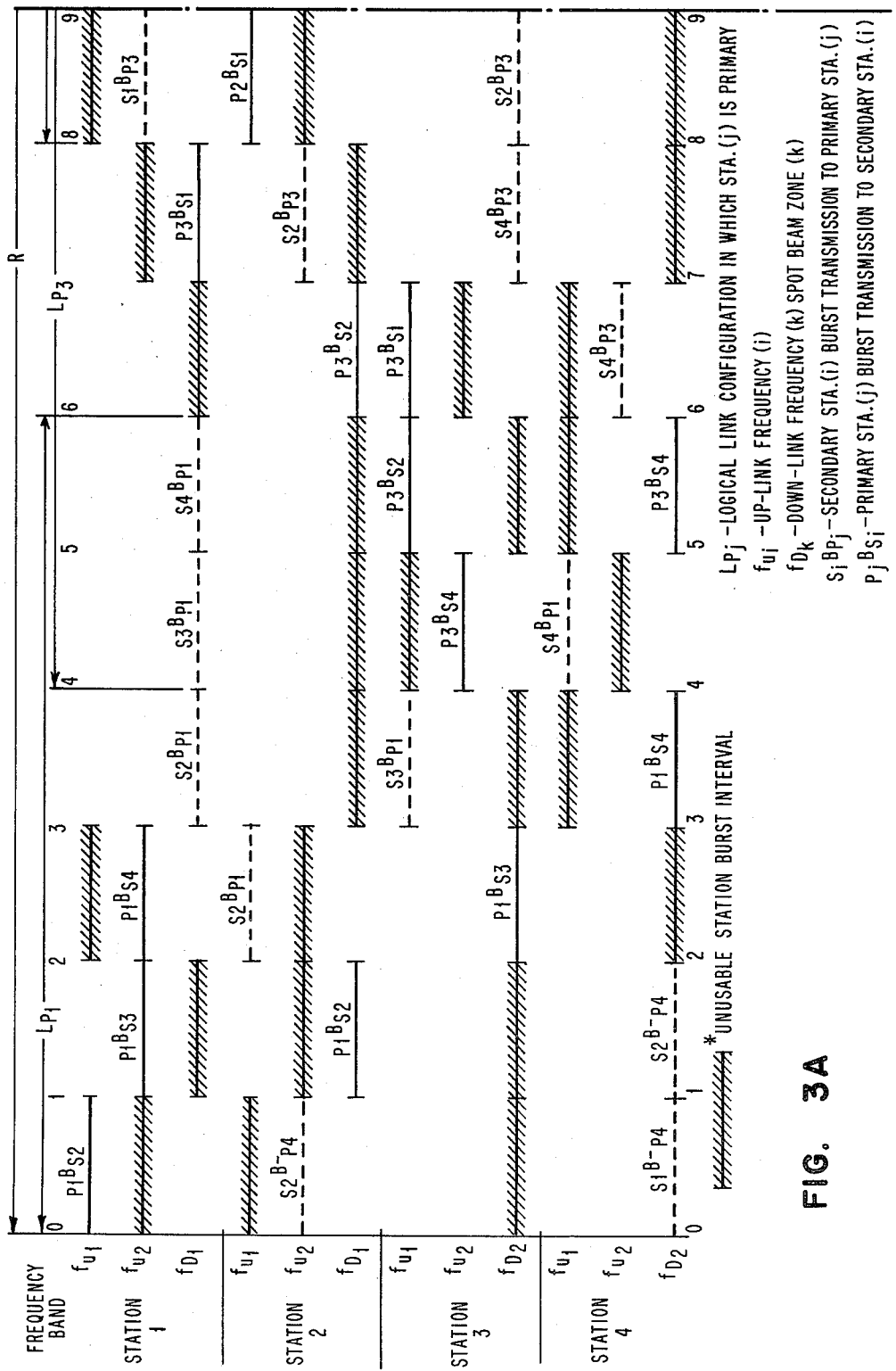
FIGS. 3a and 3b are timing diagrams for the super frame format in a double frequency system.
Figure 3B:
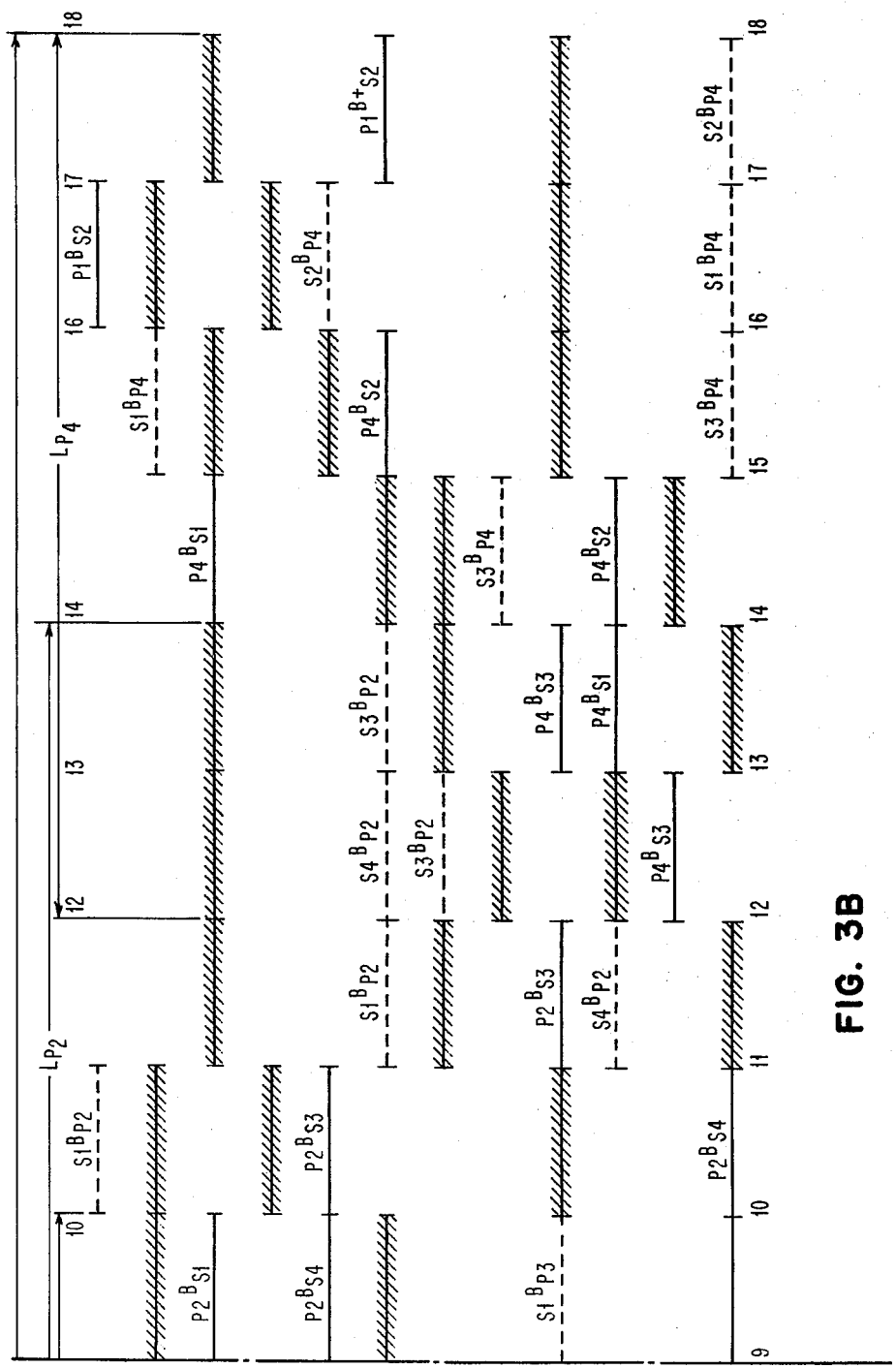

The logical link configurations are shown in FIG. 1 with the respective primary/secondary relationships. The HDLC link control procedure is the two-way alternate (TWA) or half-duplex normal response mode protocol. FIG. 1 also indicates the requirements for placement of acknowledgement buffers to support error recovery procedures within each of the logical link configurations. The sequencing of establishing logical links within the control format is shown in FIGS. 2a and 2b for different values of burst time duration. FIG. 3 shows the sequence of establishing logical links when two separate frequency channels are employed.

Each logical link includes time segments in which the primary station sends a burst of data to each of its secondary stations and for bursts of data returned from each of the secondaries (time intervals for these bursts of data can be dynamically varied depending on traffic demand in a single frequency channel method of implementation, however, in the double frequency channel method, to be described subsequently, these burst time intervals must be of a fixed time duration). These bursts contain the appropriate HDLC formats including addressing and command functions defined by the ISO standard (See ISO documents 3309 and 4335) and a variable number of variable length HDLC information frames.

Figure 4:
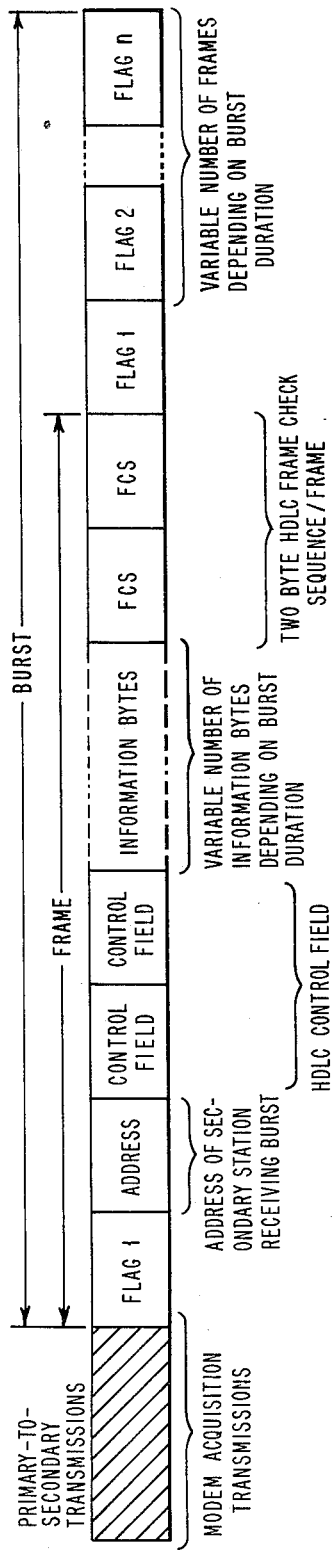
FIG. 4 illustrates the burst format for the primary to the secondary.
Figure 5:
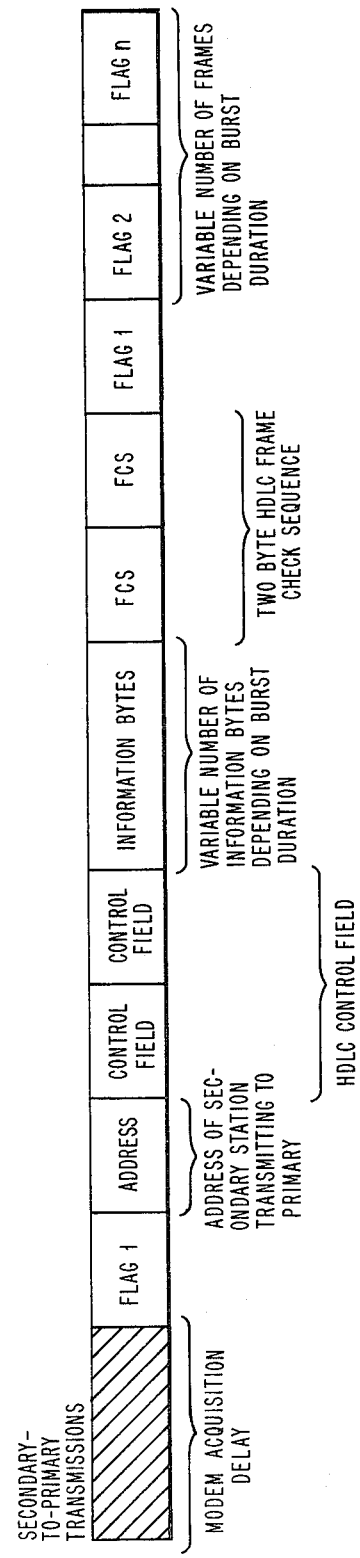
FIG. 5 illustrates the burst format from the secondary to the primary.

The formats for primary-to-secondary and secondary-to-primary bursts are shown in FIGS. 4 and 5, respectively. The secondary initiates a response burst to an explicit command according to the rules of TWX (HDX) transmission in the normal response mode. Thus, when a secondary receives a frame containing a P/F bit set to "1" from a primary station of a given logical link, it responds with a burst the last frame of which contains a P/F bit set to "1" to indicate completion of the secondary-to-primary burst. Acknowledgements of primary-to-secondary burst transmissions (according to the standard REJECT or SELECTIVE REJECT HDLC error recovery strategy) are included in secondary responses transmitted immediately after explicit permission (P/F bit=1) to transmit has been received by the secondary. Acknowledgements of secondary-to-primary transmissions are delayed until the next round-robin cycle in which the given logical link is configured. Thus, the integrity of each logical link and its associated control of frame acknowledgements is always maintained.

Implementation of the RAP System

The essential functions of the RAP invention described previously can be performed by a front-end communications controller if it is an intelligent device with the necessary buffer capacity. Alternatively, the RAP system may be implemented in software in the HOST CPU and thus reduce the communications controller function to those described below (i.e., typical of an IBM 2701 data adapter with HDLC frame generation and detection functions).

The basic type communications controller (i.e., 2701 data adapter type) must interface with the CPU channel for high speed data transfer (and perform all necessary device/channel interface functions) as well as the modem "hand-shaking" (RS232C interface standard is typical). The communications controller must also perform the basic HDLC frame formatting functions (flag insertion & FCS generation) for data transmission as well as the HDLC synchronization function (flag detection and FCS check validation) for receiving data.

RAP System Architecture

The RAP control system implementation can be viewed as a two-tier control system wherein the first level represents the elements of a logical point-to-multipoint circuit and the second level is the control for passing of the primary station functions around the network to achieve complete station-to-station connectivity.

As previously described, the first level of the RAP control system implements the standard HDLC (or SDLC) link protocol for two-way-alternate (TWA or half-duplex) transmission in the normal response mode (NRM) for point-to-multipoint configurations using the ISO unbalanced class of procedures (see ISO documents IS 3309 and DIS 4335).

The second level of the control system must be capable of switching a station's functional role from secondary to primary with minimal delay (10 microseconds typically) while still maintaining in storage all control link parameters and unacknowledged frames pertinent to the operation of each of the other logical links in which the station acts as a secondary. Likewise, at the point when the primary role is terminated and the station reverts back to a secondary role in one of the other logical links, the second level control must function to store all link parameters and unacknowledged frames pertinent to continued operation of the logical link in which the station is primary.

Additional functions required of the second level control element are:

1. Switch control for selection of the appropriate up-link frequency channel for system employing the multiple frequency mode of operation.
2. Modem control to inhibit a station's modem from transmitting a carrier when the station is not transmitting a burst (not required for burst modems).

RAP System Logic Design

As previously noted, the functions of the RAP system controller can be implemented in an intelligent front end processor, or alternatively, within a software system operating within a host machine. However, the preferred implementation of RAP is within a hardware structure which will be described as follows.

Figure 6A:
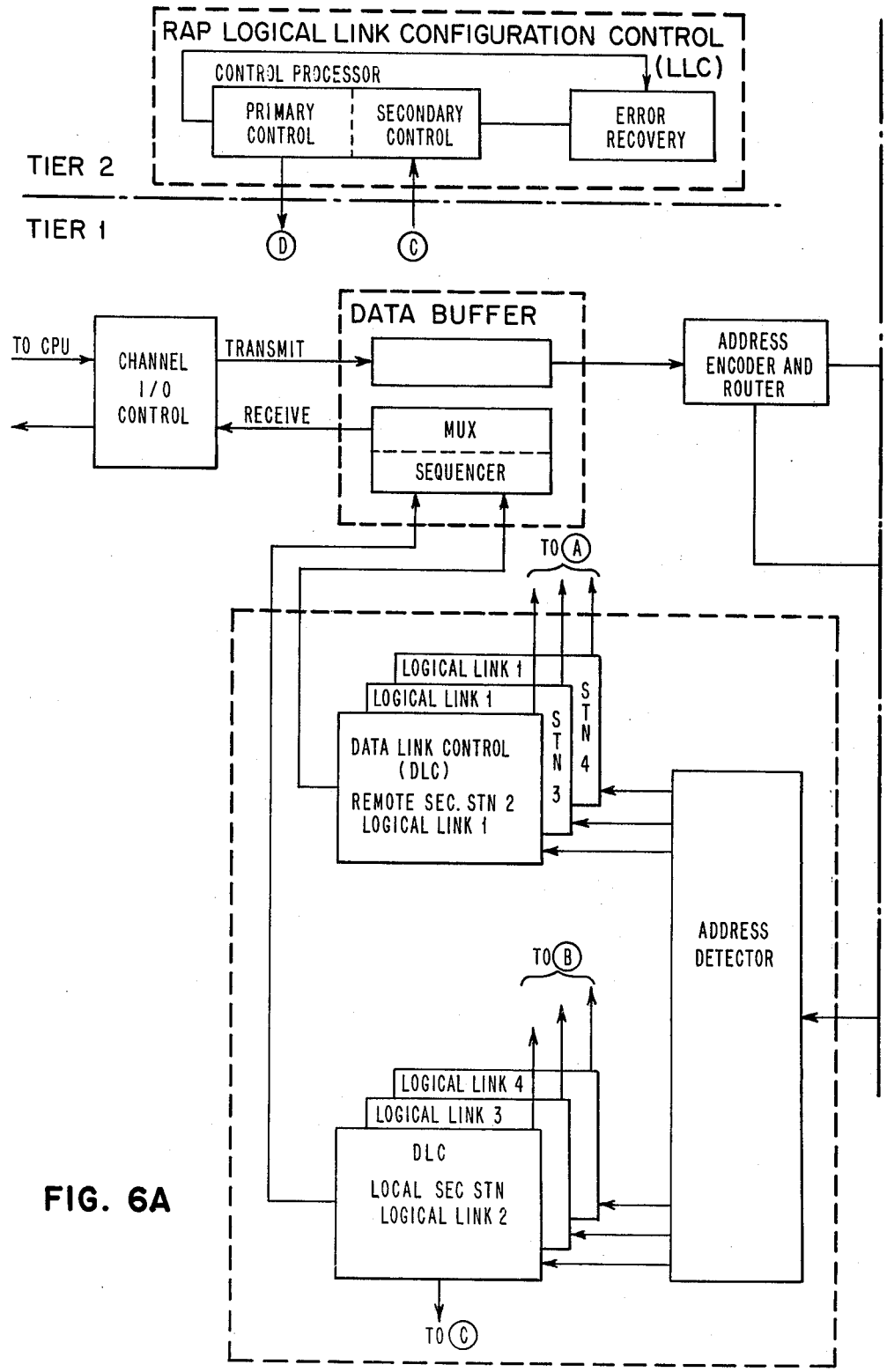
FIGS. 6a and 6b are logical block diagrams of the two tier architecture for the invention.
Figure 6B:
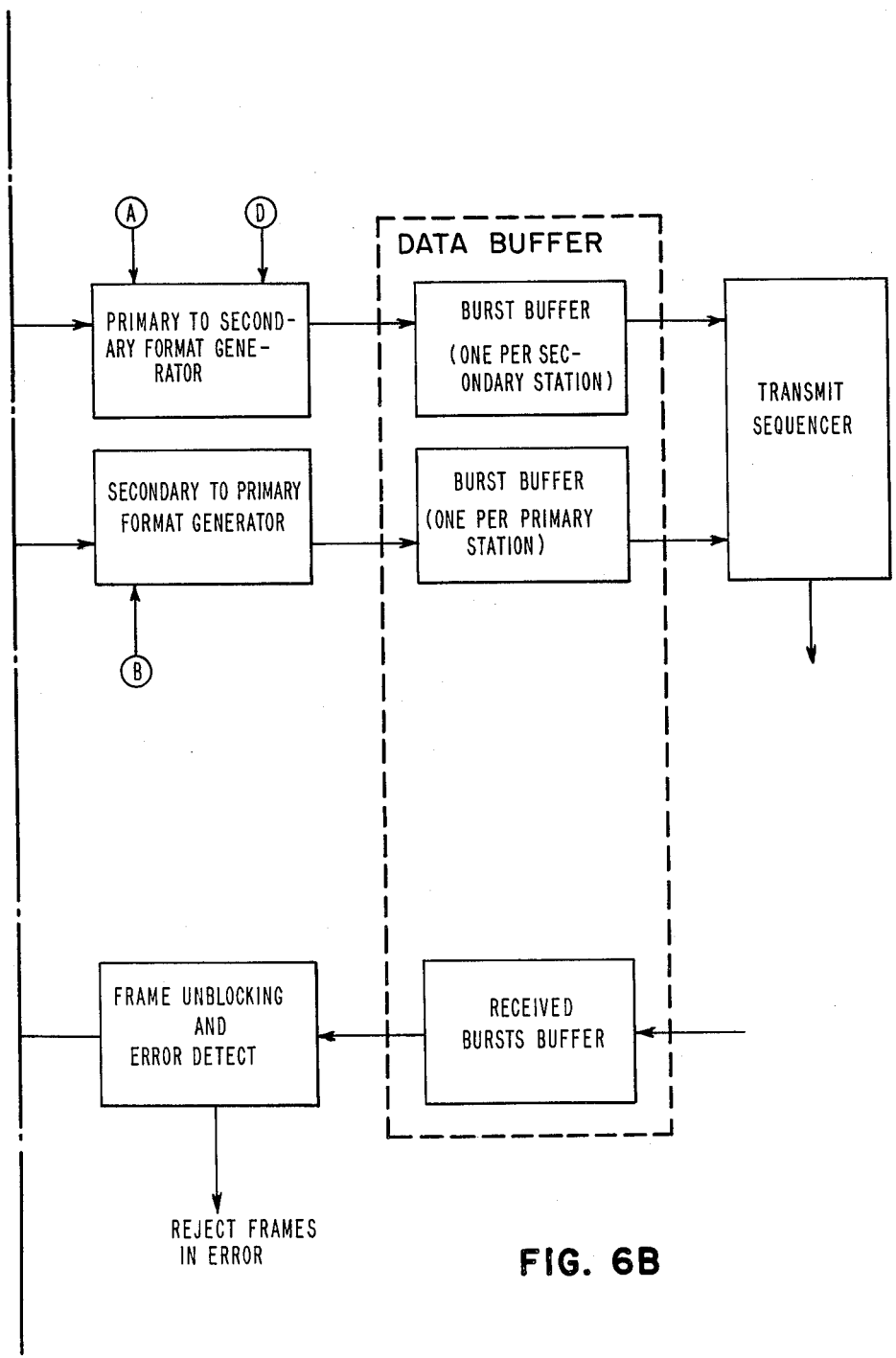

FIG. 6 outlines the two-tier architecture of the control system previously described. The second level tier, the RAP LOGICAL LINK CONFIGURATION CONTROL (LLC) functions to:

1. Initialize the logical link configuration and sequencing for a given operational period.
2. Maintain proper scheduled sequencing of logical link activation and deactivation.
3. Control adding and dropping of stations from the network during operations.
4. Control recovery from error conditions associated with continuing the roundrobin sequencing of logical links.
5. Control buffer allocation for logical link transmit, receive, and acknowledgement buffers.
6. Initialize each logical data link control (DLC) module to control the burst duration by varying module values and frame sizes.
7. Initialize each DLC module to perform the primary or secondary station functions depending on the requirements of the logical link in operation.
8. Permit operator interaction to configure logical link configurations and sequencing.

FIG. 6 also outlines the first tier control modules which function to perform the basic HDLC control functions within each logical link configuration. These functions are:

1. DLC—For primary station operation:
   perform all necessary command and data transfer functions according to the ISO standard classes or procedures (see previously referenced ISO documentation) for unbalanced mode operations using the TWA and NRM protocol.
   control the transmit burst length by using modulo value and frame size initialization parameters given by the LLC.
   format and transmit user data using HDLC procedure.
   receive and acknowledge user data using HDLC procedure.
   DLC—For secondary station operation:
   react to primary commands using appropriate responses required by the above protocol.
   format and transmit user data using HDLC procedure.
   receive and acknowledge user data using HDLC procedure.
2. CAM—For implementation of the RAP functions within a HOST CPU:
   provide all necessary functions required by the CPU operating system to transfer and receive data between CPU channels and the basic communications controller.
   Required CAM functions differ depending on CPU operating systems and channel interface levels to which the CAM is attached. However, typically these functions include:
   build channel program and establish memory locations for each data transfer I/O operation.
   provide sense information required by CPU channel controller relative to success or failure at the completion of each I/O operation.
   provide functions to interface with data router during DLC generated data transfer operations.

RAP System Functions

Figure 7A:
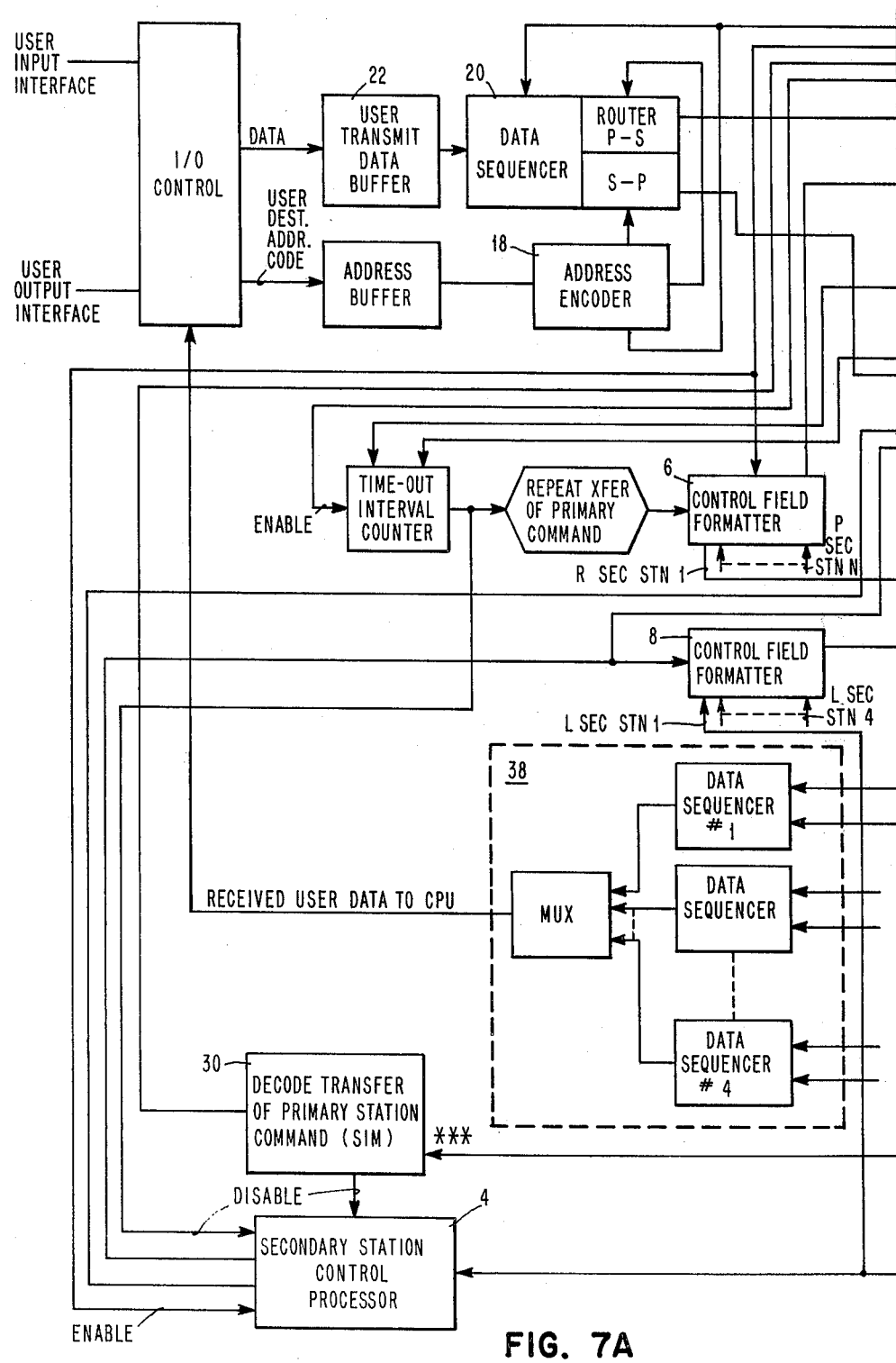
FIGS. 7a, 7b and 7c are functional block diagrams of the invention.
Figure 7B:
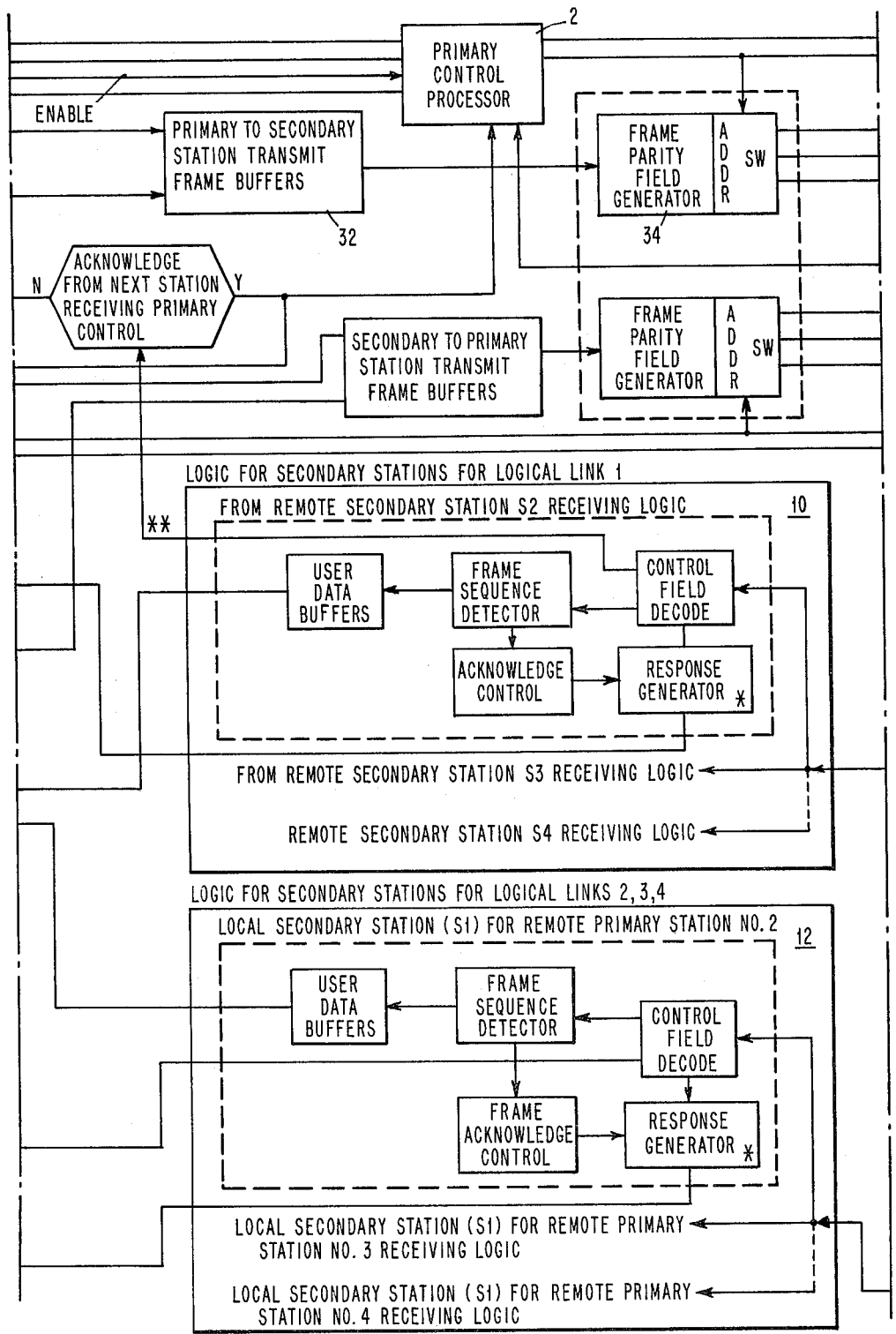
Figure 7C:
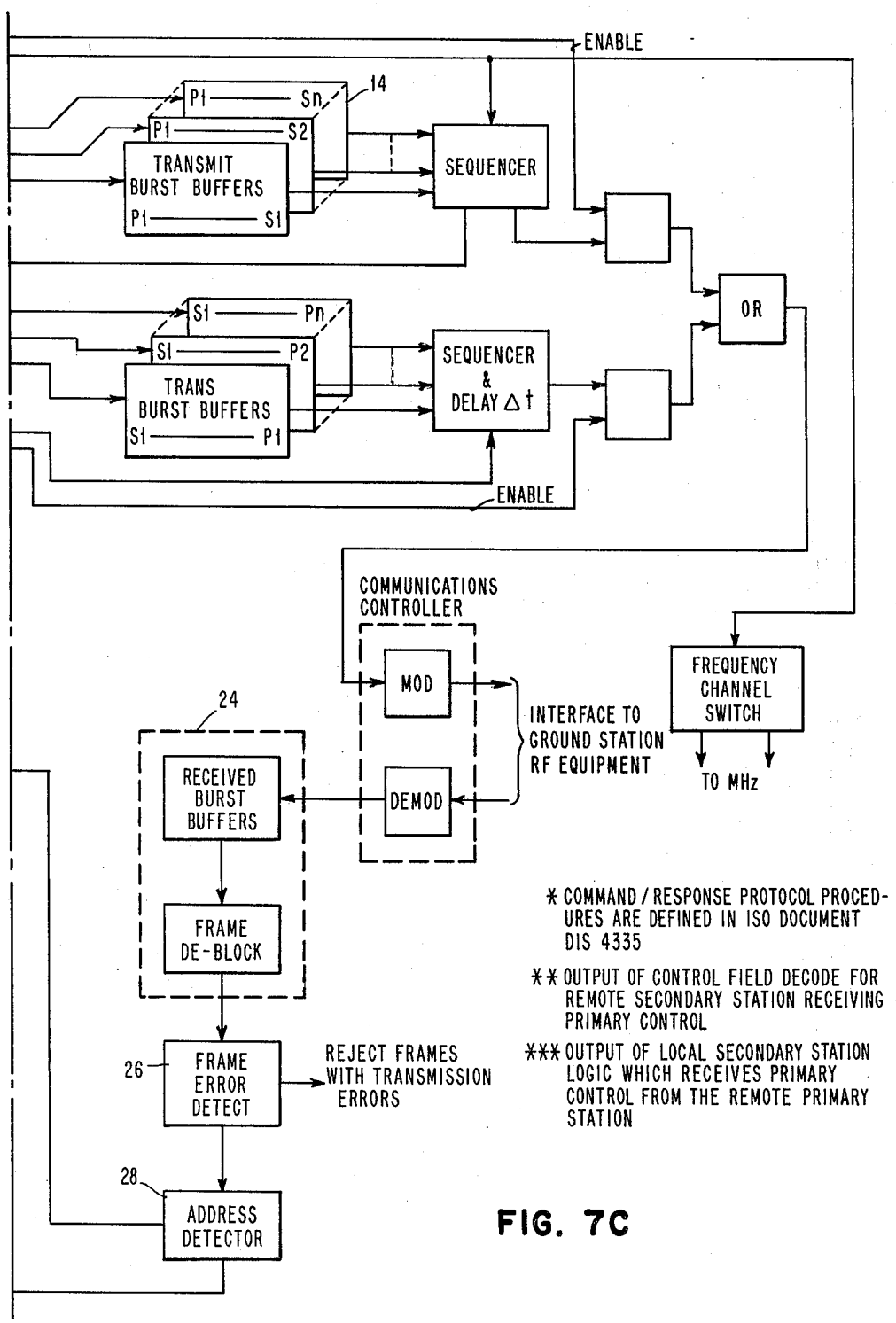

FIG. 7 contains the functional design for a single network node that would be implemented within a RAP system configuration. Each network node would contain the two levels of control previously described in the architecture thus dividing the functions into:

1. functions required for sequentially transferring the primary station control from one station to another within the network, and;
2. functions required to control each logical link configuration (See FIG. 1 for logical links of the example 4 node network). The functions required at each of these levels of control are summarized as follows:

Level 1

1. Perform the primary station data link control protocol functions associated with formatting messages and implementing elements of procedures necessary for transfer of data and control information between a primary station and multiple secondary stations on a logical multi-drop transmission circuit (see FIG. 1). Suggested DLC formats and elements of procedures are defined in ISO HDLC Standards documents IS 3309 and D15 4335. (See FIG. 7 block 10 for logic to perform these functions).

2. Perform complimentary secondary station functions associated with those required in paragraph 1 above for secondary stations operating logical multi-drop links under control of remote primary stations (see FIG. 1) (See FIG. 7 block 12 for logic to perform these functions.)
3. Perform data routing function for incoming data (see FIG. 7 block 28) data to switch message frames to proper logic data link control functional elements.
4. Perform data routing function for incoming data (see FIG. 7 block 38) to recombine user data frames transmitted over primary-to-secondary and secondary-to-primary logical link paths into a serial data stream in which proper user data message sequence is maintained.
5. Perform data routing function for outgoing data (see FIG. 7 block 20 and block 21) to sequence user data messages and to route messages to proper logical data link control functional elements for transmission.
6. Buffer user data and segment user records into proper frame sizes for transmission (see FIG. 7 block 10).
7. Buffer data received over transmission network and unblock received frames for passage through routing logic. (see FIG. 7 block 24)
8. Perform error checking and reject data frames containing bit transmission errors (see FIG. 7 block 26).
9. Perform parity field generation for transmitted data link frames (see FIG. 7 block 34).

Level 2

1. Perform the overall station synchronization functions required to implement the timing of activation and deactivation of the RAP system logical links in accordance with the super frame format timing sequence shown in FIG. 3 (for double frequency system) and FIG. 2 (for single frequency system). (see FIG. 7 blocks 2, 4, and 30)
2. Buffer logical link data and supervisory control frames for transmission in proper super frame interval as determined by logic associated with function 1 above. (see FIG. 7 blocks 14 and 15)
3. Compute secondary station delay response timing based on formula $t=2B-TD$ for single frequency mode of operation and sequence responses in accordance with superframe format. (see FIG. 7 blocks 37 and 16)
4. generate transmitted frame parity check field and format transmitted frames in accordance with DLC protocol. (see ISO document IS 3309) (see FIG. 7 blocks 34, 6, 8)
5. Perform error recovery procedures required when primary control function is not passed properly between stations.

The following paragraphs describe the logic flow involved in interconnecting the functions described above and coordinating the two levels of RAP system operational control.

RAP System Logic Flow Description

The data flow is initially described with the operation of the node as a primary station and subsequently when the station reverts to the secondary role for the other three logical link configurations (see FIG. 1). A four station example is assumed and the operation of a logical link configuration (see FIG. 1) where primary 1 is transmitting to secondary stations 2, 3, and 4 is described. When the station is operating as a primary, and has been initialized by the primary station control processor 2, it receives bursts from other secondary stations through the burst buffer channel 24, and transmits bursts to secondary stations through the logic associated with blocks 14, 32, 20, and 22.

The primary station functions consist of: format data from users received through block 22, interpret the address information provided by the user; and encode that information in block 18 such that user data can be transmitted to any of the secondary stations in the logical link configuration (LP1) where this node is the primary station.

The transmission function starts with the user passing data to the system through I/O control to the user data buffer 22. At this point the user must also pass destination address information so that the system can route the data to the proper secondary station. The data is received, the address information is encoded (in block 18), the system router 20 is set by the primary control processor 2 to route the data. This data is routed (since at this point the system is operating with this station as primary) to the appropriate primary to secondary station transmit frame buffers 32. At this point the data is formatted into HDLC transmit frames and passed to the frame parity field generator 34 which in turn, under control of the address routing switch block 34 transmits the data to the appropriate transmit burst buffer 14. As shown in FIG. 7, there are three burst buffers associated with the transmit burst buffer, 14 one buffer for each primary to secondary station pair. At this point data is formatted (see FIG. 4 for burst format), awaiting transmission over the logical link (LPI) configuration, shown in FIG. 1. The primary station control processor can control the sequence in which the frames are transferred out of the transmit buffer locations into the actual transmit channel in order to synchronize the transmitted sequence with the super frame formats shown in FIGS. 2a, 2b or FIG. 3.

While the station is operating in the primary role it will also receive frames from the other three secondary stations that are currently operating in the secondary mode. The receive buffers will accept the burst formats from the secondary stations. The secondary to primary burst format is depicted in FIG. 5. These frames are received and buffered in block 24, the frames are unblocked and the frame check sequence each frame is processed to determine if there are any transmission errors, erroneous frames are rejected at this point 26. The secondary address is detected by block 28. This address represents the secondary station from which the frame has been received on the logical link LP1, configuration. This indicates to the primary station to route these secondary addresses to block 10 which contains the logic to support the secondary stations of the logical link LP1. The individual frames are passed to the logic associated with the individual receiving or transmitting secondary stations as determined by the address detector 28. Within the logic associated with block 10 the control field is decoded and the response that was generated by the secondary station is interpreted in the control field decode logic. The sequence number of the data frames is detected and the proper acknowledgement control is generated to produce an acknowledgement in the response generator consistant with the data link protocol. The proper response is passed to the control field formatter 6 for formatting in the next frame that is transmitted back to that particular secondary station in order to acknowledge data transferred correctly from that secondary station. This is done for each secondary station in the logical link configuration within the logic associated with the box 10.

At this point the discussion has been relevant to the transmission of data from users to other users at remote locations based on the primary to secondary logical link path associated with this local station. Logical link initialization control has been under the control of the primary station control processor 2. The primary station control processor is programmed to transfer primary station control from the local station, by inserting into the control frame format associated with the control field formatter 6, a Set Initialization Mode command. This SIM command is formatted in the control field of the HDLC frame that is being sent to the secondary station that is to receive primary control. Having inserted the SIM command into the control field that will be sent to the remote secondary station that is to receive the primary role, the primary station control processor continues to operate in the primary role while the SIM command is being processed through the transmit buffers, 14, and out on the link. Once the acknowledgement from the remote secondary station receiving the SIM command is received back at the local station the local station then inhibits the primary control processor and passes initialization control of the local station to the secondary station control processor 4. This secondary station control processor then initializes the logic associated with block 12 so that the local station can operate as the appropriate secondary station to sequentially support the operation of logic links 2, 3, and 4, depicted in FIG. 1.

While operating as a secondary station the local station sequentially receives bursts from the other stations operating as primary, and these bursts are processed through the receive logic and buffering associated with block 24, in a manner identical to the previous mode of operation. The frames are rejected by block 26 and the addresses are detected by block 28. The unique address associated with the local station secondary modes of operation are then detected by block 28 so that the frames coming from the remote primary stations can be properly routed to the logic associated with the correct secondary station operation. The local station has been allocated three secondary station addresses for this four node example. Each of these addresses correspond to one of the three logical links associated with the other three station's primary operation (see FIG. 1; Lp2, Lp3, Lp4). The control field is decoded in block 12 for each logical link configuration in which the local station operates as a secondary station. The data frame sequence numbers are also detected and acknowledgements are generated and formatted by the response generator to be sent to the control field formatter by block 8 and subsequently transmitted as a response. The control field formatter in this case formats the responses of the local secondary station to be transmitted to the remote primary. These secondary station's responses formatted by block 8 are then transferred to block 36 which controls the formatting of the frames being sent from secondary back to primary stations. This blocks includes data routed from the user and from the router 20. The address encoder 18 is initialized so that it operates as a local secondary station and the data is routed to the appropriate secondary to primary logical link to be formatted in this frame buffer associated with block 17 so that the data to be sent under the logical link control of the proper secondary to primary link. There are three buffers associated with the secondary-to-primary link paths. Each of these three buffers is associated with one of the three logical links in FIG. 1. This data is then sequenced under the control of the secondary station control processor in block 4 so that it is transmitted out on the link in the proper format (see FIGS. 2a, 2b, and 3) in response to the remote primary station's poll.

The secondary level control is established when the local station accepts primary station control. When the logical link sequencing returns to the local station as primary configuration the local station receives a command from a remote primary to re-initialize as a primary station. At this point an acknowledgement is sent to the remote primary station and local control is passed to the primary station processor 2 which initializes the node to function as a primary station as previously described.

In a uniform traffic distribution case each primary station is assigned a fixed time interval in which to operate as primary. At the completion of this interval the station passes to a predetermined secondary station in the primary control and a round robin loop is established in a sequential order (see FIGS. 2a, 2b, and 3).

However, if one station does not have data to transmit, and consequently there is no need for him to assume the primary role, it can be bypassed in the ordering sequence and operate only as a secondary. In this case the station would not participate as primary and it would only act as a data sink. The other transmitting stations would be able to assume the role as primary and act as data sources.

The TDMA satellite communications system disclosed herein enables specialized data conferencing and broadcast circuit arrangements to be implemented. Access ports for these types of circuits can provide for high data retransmission between each ground station in the broadcast circuit. The invention establishes a protocol whereby multiple ground stations can share broadcast and conference circuits provided by the TDMA system without interference with the operation thereof.

While the invention has been particularly shown and described with reference to the preferred embodiment thereof, various changes in form and detail may be made therein without departing from the spirit and scope of the invention.

Having thus described my invention, what I claim as new, and desire to secure by Letters Patent is:

1. A network control method for a satellite communications network having a plurality of terrestrially based communication nodes, each node including a host computer, a communications controller, a modulator/demodulator, and an RF transmission/reception terminal, comprising the steps of:

assigning a first one of said nodes as a primary control node and the remaining ones of said plurality of nodes as secondary nodes in said network, establishing a first point to multipoint broadcast subnetwork within said network;

conducting two-way point to multipoint data transmissions from said first primary node to said first secondary nodes and transmitting commands via said satellite for link control;

transferring said primary control function from said first primary node to a second primary node selected from one of said plurality of first secondary nodes;

establishing point to multipoint data and control transmission from said second primary node to the remaining nodes in said network as second secondary nodes;

continuing the steps of passing primary control to successive ones of said nodes and said network and conducting point to multipoint broadcast data and control transmissions from the new primary node to the new secondary nodes;

whereby time division multiple access communication between said nodes in said network is achieved.

2. A satellite communications controller being one of a plurality of such controllers for operation in a network having a plurality of communication nodes over a satellite link, each node having one such controller, the local controller assuming a primary control status while the remaining remote controllers in said network assume a secondary control status during a first point-to-multipoint broadcast subnetwork operation between said local controller and said remaining remote controllers, said local controller transferring said primary control function from itself to one of said remaining remote controllers establishing point-to-multipoint data and control transmission from said one of said remaining controllers while said local controller assumes a secondary control status, comprising:

a first level control means in said controller for implementing the point to multipoint subnetwork connection between said controller and said remaining controllers in said network;

a second level control means in said controller for passing the primary station status from one node to another over said satellite link;

whereby time division multiple access communication between said nodes in said network is achieved.

3. A satellite communications controller being one of a plurality of such controllers for operation in a network having a plurality of communication nodes over a satellite link, each node having one such controller, the local controller assuming a primary control status while the remaining remote controllers in said network assume a secondary control status during a first point-to-multipoint broadcast subnetwork operation between said local controller and said remaining remote controllers, said local controller transferring said primary control function from itself to one of said remaining remote controllers establishing point-to-multipoint data and control transmission from said one of said remaining controllers while said local controller assumes a secondary control status, comprising:

a first level control means in said controller for implementing the point-to-multipoint subnetwork connection between said controller and said remaining controllers in said network;

a second level control means in said controller for passing the primary station status from one node to another over said satellite link;

said first level control means further comprising:

a primary control processor for controlling the function of said local controller during its primary control status;

a secondary control processor for controlling the function of said local controller during its secondary control status;

a user input signal router having a control input connected to said primary control processor, a primary signal output and a secondary signal output, for steering said input signal into said primary or secondary signal output in response to said primary control processor;

a primary transmit burst buffer having an input connected to said primary signal output of said router and an output connected to said satellite link, for storing primary output signals to be transmitted over said satellite link during said primary control status of said local controller;

a secondary transmit burst buffer having an input connected to said secondary signal output of said router and an output connected to said satellite link, for storing secondary output signals to be transmitted over said satellite link in response to a transmit command for one of said remote controllers having the primary status, during said secondary control status of said local controller;

a satellite link input address decoder having an input connected to the satellite link, a primary link signal output and a secondary link signal output, for switching said link input to said primary link output or secondary link output in response to the coded representation of said link input address as being from a remote controller in said primary status or in said secondary status, respectively;

a primary link logic connected to said primary link output, for processing data messages transmitted from a remote controller in said primary status having a control input connected to said secondary control processor;

a secondary link logic connected to said secondary link output, for processing data messages transmitted from a remote controller in said secondary status, having a control input connected to said primary control processor;

a data sequencer having first and second inputs connected to said primary link logic and said secondary link logic and a user output, for arranging data messages output from said primary and secondary link logic into the order received over said satellite link;

whereby time division multiple access communication between said nodes in said network is achieved.

4. The controller of claim 3, wherein said second level control means comprises:

storage means connected to said primary control processor for storing the identity of the remote controller which will have the next primary control status;

control transfer signalling means connected to said primary control processor for transmitting to the remote controller identified in said storage means a control signal to initiate primary status operation, in response to said primary control processor;

control transfer signal acknowledgement means connected to said primary and secondary control processors, for receiving an acknowledgement signal from said remote controller identified in said storage means and initiating the transfer of control of said local controller from said primary to said secondary control processor, said local controller then assuming secondary control status.

5. The controller of claim 4, wherein said primary control processor initiates the operation of said control transfer signalling means at a predetermined time after primary control status was assumed by the local controller.

6. The controller of claim 4, wherein said primary control processor initiates the operation of said control transfer signalling means at a time after primary control status was assumed, the duration of which is proportional to the number of primary output signals stored in said primary transmit burst buffer.

* * * * *